Nov. 27, 1956  M. E. BOWEN ET AL  2,772,344
ELECTRIC WATER HEATER
Filed Jan. 25, 1954
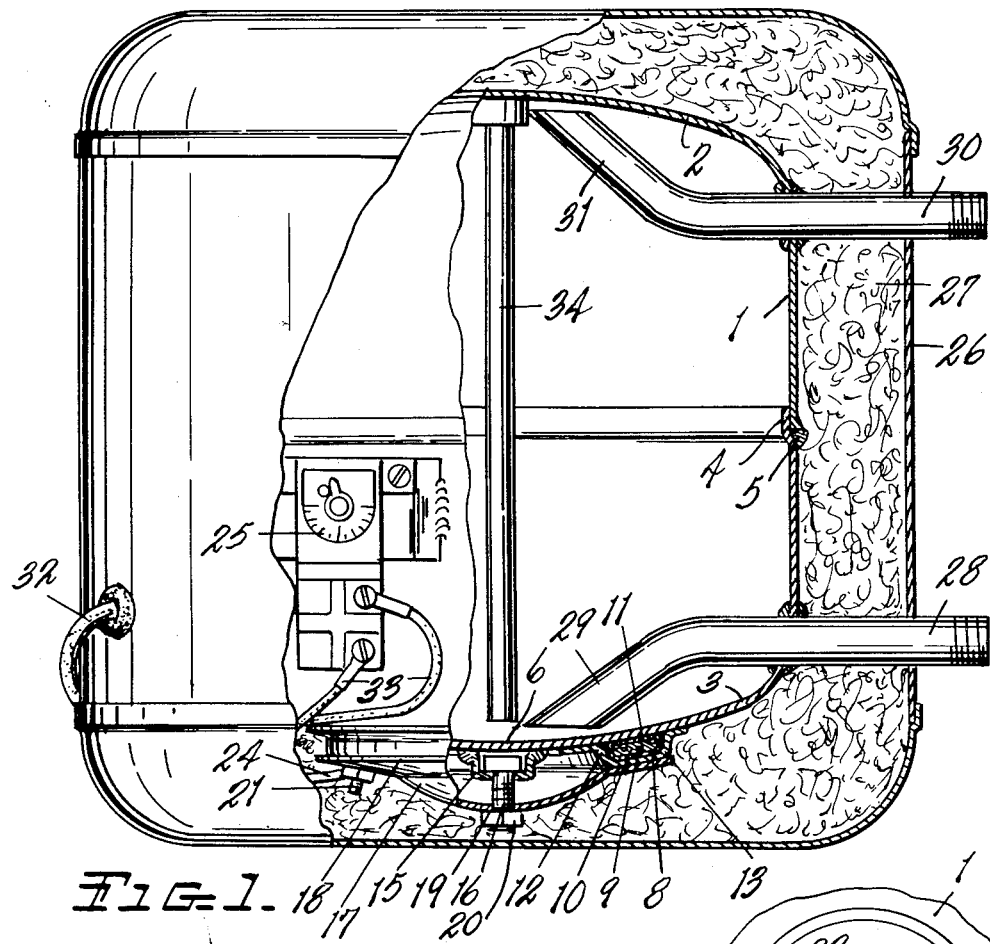
INVENTORS
MAX E. BOWEN
Joseph A. Harnish
Theodore F. Carlson
By Otto A. Earl
Attorney

United States Patent Office 2,772,344
Patented Nov. 27, 1956

2,772,344

ELECTRIC WATER HEATER

Max E. Bowen, Joseph A. Hanish, and Theodore E. Carlson, Wixom, Mich., assignors to Handling Equipment & Manufacturing Company, Wixom, Mich.

Application January 25, 1954, Serial No. 405,976

10 Claims. (Cl. 219—38)

This invention relates to an electric water heater.

The main objects of this invention are:

First, to provide an electric water heater which is highly efficient and one in which the heating element is so disposd as to effectively transmit heat therefrom and at the same time is effectively protected.

Second, to provide a water in which the heating element unit is clampingly supported against the bottom wall of the tank, the supporting means constituting heat reflecting and transfer means.

Objects relating to details and economies of the invention will appear from the description to follow: The invention is defined and pointed out in the claims.

A preferred embodiment of the invention is illustrated in the accompanying drawing, in which:

Fig. 1 is a side elevational view of a water heater embodying our invention partially broken away and partially in vertical section to disclose structural details.

Fig. 2 is a fragmentary view of certain of the parts in disassembled relation, certain of the parts being partially broken away and in section.

Fig. 3 is a fragmentary bottom view showing details of the heating unit supporting means.

The structure illustrated comprises a water tank designated generally by the numeral 1 and comprising a top section 2 and a bottom section 3 drawn from sheet metal. The side wall of the bottom section 3 has an inset flange 4 with which the side wall of the top section telescopes. An electric weld is indicated at 5 thus forming a completely closed tank with a convexedly curved bottom 6.

The annular heating element designated generally by the numeral 7 comprises a flattened tubular shell or sheath 8 for the resistance elements 9 which are embedded in an insulating material 10 fitting the shell. The sheath or shell 8 has a concavely curved face 11 contactingly fitted against the convexedly curved bottom wall as is shown in Fig. 1.

The holder member 12 is formed as a sheet metal stamping and is also convexedly curved to fit against the tank bottom. This holder has an annular downwardly offset portion 13 forming an upwardly opening groove in which the heating unit is disposed. The holder 12 has a central opening 14 to receive the bracket 15 by means of which the stud or bolt 16 is secured centrally to the bottom of the tank.

The dished or concavo convex combined clamping member, reflector and heat transfer 17 is provided with an annular rim portion 18 which fits against the underside of the bottom wall of the groove of the holder member. The clamping member 18 has a central hole 19 receiving the stud 16. A nut 20 on the stud clamps the member 17 against the holder member and through it clamps the holder member and the face of the heating unit against the bottom of the tank.

The heating element unit has binding posts 21 depending therefrom and the holder member and clamping member are provided with holes 22 and 23 respectively through which the binding posts project to receive the wires indicated at 24.

A thermostat 25 is associated with the side wall of the tank to be heated thereby but as the details form no part of our present invention they are not illustrated or further described herein.

The casing 26 surrounds the tank in spaced relation to receive the insulating material 27. The water inlet pipe 28 has a downwardly directed discharge end 29 directing the incoming water against the bottom of the tank. The outlet or draw-off pipe 30 has an upwardly directed inner end 31 opening closely to the top wall of the tank. A protective anode 34 which may desirably be of magnesium is disposed centrally within the water tank depending from the top wall thereof. 32 designates the current supply connection and 33 the connections for the heating unit to the thermostat. With this arrangement of the parts the tank may be very economically produced and the electric heating unit is disposed externally thereof so that it is not subjected to any corrosive action.

The heating unit holder member is clamped against the bottom of the tank and the holder member and associated parts are such as to effectively transmit a very high percentage of the heat developed to the tank. Such expansion and contraction as takes place does not in anywise affect the transmission of heat from the heating unit to the tank or in anywise injure the electrical connection to the heating unit.

We have illustrated and described our water heater in a highly practical embodiment thereof. We have not attempted to illustrate or describe other modifications or adaptations as it is believed this disclosure will enable those skilled in the art to embody or adapt our invention as may be desired.

Having thus described our invention, what we claim as new and desire to secure by Letters Patent is:

1. A water heater comprising a closed water tank having a convexedly curved bottom wall, an annular heating element unit including a shell of flattened tubular section having a concavedly curved inner face contactingly fitting said convexedly curved tank bottom wall, a combined holder and heat transfer member for said heating element unit concavedly curved and contactingly fitting against the convexedly curved tank bottom wall and having an upwardly facing annular groove in which said heating element unit is disposed to support the heating element unit against the tank bottom wall, a dished combined clamping reflector and heat transfer member having a peripheral portion underlappingly engaging the bottom wall of the groove in said holder, and a threaded stud depending centrally from the said tank bottom wall and disposed through a central opening in said clamping member, said stud being provided with a nut for clamping said bottom wall contacting parts thereto, said heating element unit being provided with downwardly projecting binding posts, said holder and clamping member being provided with openings through which said posts project.

2. A water heater comprising a closed water tank having a convexedly curved bottom wall, an annular heating element unit including a shell of flattened tubular section having a concavedly curved inner face contactingly fitting said convexedly curved tank bottom wall, a combined holder and heat transfer member for said heating element unit concavedly curved and contactingly fitting against the convexedly curved tank bottom wall and having an upwardly facing annular groove in which said heating element unit is disposed to support the heating unit against the tank bottom wall, a combined clamping and heat transfer member having a peripheral portion underlappingly engaging the bottom wall of the groove in said holder, and a threaded stud depending centrally from the said tank bottom wall and disposed through a central opening in said clamping member, said stud being provided with a nut for clamping said bottom wall contacting parts thereto.

3. A water heater comprising a closed water tank having a convexedly curved bottom wall, an annular heating element unit including a shell of flattened tubular section having a concavedly curved inner face contactingly fitting said convexedly curved tank bottom wall, a holder and heat transfer member for said heating element unit concavedly curved and contactingly fitting against the convexedly curved tank bottom wall and having an upwardly facing annular groove in which said heating element unit is disposed to support the heating element unit against the tank bottom wall, a combined clamping and heat transfer member having a peripheral portion underlappingly engaging the bottom wall of the groove in said holder, and means carried by the tank for clamping said clamping member upon said holder, and means for clampingly supporting said holder member against the bottom of the tank.

4. A water heater comprising a closed water tank having a convexedly curved bottom wall, an annular heating element unit including a shell of flattened tubular section having a concavedly curved inner face contactingly fitting said convexedly curved tank bottom wall, a holder and heat transfer member for said heating element unit concavedly curved and contactingly fitting against the convexedly curved bottom wall and having an upwardly facing annular groove in which said heating element unit is disposed to support the heating element unit against the tank bottom wall, and means for clampingly supporting said holder member against the bottom of the tank.

5. A water heater comprising a water tank having a bottom wall of uniform thickness, an annular heating element including a sheath having an inner face contactingly fitting said tank bottom wall, a combined holder and heat transfer member for said heating element unit contactingly fitting said tank bottom wall, and having an upwardly facing annular groove spaced radially inwardly of its periphery in which said heating element unit is disposed to support the heating element unit against the tank bottom wall with portions of said holder and transfer member in heat transfer contact with the bottom wall of the tank at the inner and outer side of the heating element, a supporting and heat transfer member underlappingly engaging the bottom wall of the groove in said holder member, and a stud depending from the said tank bottom wall and disposed through a central opening in said supporting member, said stud being provided with a nut engaging said supporting member centrally thereof, said heating element unit being provided with downwardly projecting binding posts, said holder and supporting member being provided with openings through which said posts project.

6. A water heater comprising a water tank having a bottom wall of uniform thickness, an annular heating element including a sheath having an inner face contactingly fitting said tank bottom wall, a combined metal holder and heat transfer member for said heating element unit contactingly fitting said tank bottom wall and having an upwardly facing annular groove in which said heating element unit is disposed to support the heating element unit against the tank bottom wall with portions of said holder and transfer member in heat transfer contact with the bottom wall of the tank at the inner and outer side of the heating element, a supporting and heat transfer member underlappingly engaging the bottom wall of the groove in said holder member, and means carried by the tank for clampingly securing said supporting member against said holder member.

7. A water heater comprising a water tank having a bottom wall of uniform thickness, an annular heating element, a combined metal holder and heat transfer member for said heating element contactingly fitting said tank bottom wall and embracing a substantial area thereof and having an upwardly facing annular groove spaced radially inwardly of its periphery in which the said heating element is disposed to support the heating element with portions of said holder and heat transfer member in heat transfer contact with the bottom wall of the tank at the inner and outer side of the heating element, a clamping and heat transfer member underlappingly engaging the bottom wall of the groove in said holder member, and a stud depending from said tank bottom wall and disposed through a central opening in said clamping member, said stud being provided with a nut engaging said clamping member centrally thereof.

8. A water heater comprising a water tank having a bottom wall, an annular heating element, a combined metal holder and heat transfer member for said heating element contactingly fitting said tank bottom wall and embracing a substantial area thereof and having an upwardly facing annular groove in which the said heating element is disposed to support the heating element with portions of said holder and heat transfer member in heat transfer contact with the bottom wall of the tank at the inner and outer side of the heating element, and means for securing said holder member in heat transfer contacting relation to said tank wall.

9. A water heater comprising a water tank having a bottom wall, an annular heating element including a sheath having an inner face contactingly fitting said tank bottom wall, a metal holder and heat transfer member for said heating element unit contactingly fitting said tank bottom wall and having an upwardly facing annular groove in which said heating element is disposed in contacting relation to the bottom of the member to support the heating element against the tank bottom wall with portions of said holder and transfer member in heat transfer contact with the bottom wall of the tank at the inner and outer side of the heating element, a support member underlappingly engaging the bottom wall of the groove in said holder, and means depending from said tank centrally through said clamping member for clamping said clamping member upon said holder.

10. A water heater comprising a water tank having a bottom wall, a heating element including a sheath having an inner face contactingly fitting said tank bottom wall, a metal holder and heat transfer member for said heating element unit contactingly fitting said tank bottom wall and having an upwardly facing annular groove in which said heating element is disposed in contacting relation to the bottom of the member with portions of said holder and heat transfer member in heat transfer contact with the tank bottom wall at the inner and outer sides of said heating element, a support member underlappingly engaging the bottom wall of the groove in said holder, and means depending from said tank centrally through said clamping member for clamping said clamping member upon said holder.

References Cited in the file of this patent
UNITED STATES PATENTS

| 1,170,170 | Kuhn et al. | Feb. 1, 1916 |
| 1,533,291 | Woodson | Apr. 14, 1925 |
| 1,689,196 | Dunn | Oct. 30, 1928 |
| 1,880,255 | Johnson | Oct. 4, 1932 |
| 2,518,566 | Osterheld | Aug. 15, 1950 |